United States Patent
Homme et al.

(10) Patent No.: US 6,278,118 B1
(45) Date of Patent: Aug. 21, 2001

(54) RADIATION DETECTION DEVICE AND METHOD OF MAKING THE SAME

(75) Inventors: Takuya Homme; Toshio Takabayashi; Hiroto Sato, all of Hamamatsu (JP)

(73) Assignee: Hamamatsu Photonics K.K., Shizuoka-ken (JP)

( * ) Notice: Subject to any disclaimer, the term of this patent is extended or adjusted under 35 U.S.C. 154(b) by 0 days.

(21) Appl. No.: 09/247,298

(22) Filed: Feb. 10, 1999

Related U.S. Application Data

(63) Continuation-in-part of application No. PCT/JP98/00550, filed on Feb. 12, 1998.

(30) Foreign Application Priority Data

Feb. 14, 1997 (JP) .................................................. 9-030508

(51) Int. Cl.⁷ .................................................. G01T 1/202
(52) U.S. Cl. .............................. 250/370.11; 250/370.09; 250/367
(58) Field of Search .................... 250/370.11, 370.09, 250/367, 483.1

(56) References Cited

U.S. PATENT DOCUMENTS

| | | | |
|---|---|---|---|
| 4,066,908 | * 1/1978 | Farukhi et al. | 250/483.1 |
| 4,181,856 | * 1/1980 | Bone | 250/370.09 |
| 4,982,095 | 1/1991 | Takahashi et al. | 250/367 |
| 5,066,861 | * 11/1991 | Nakayama et al. | 250/370.09 |
| 5,132,539 | 7/1992 | Kwasnick et al. | 250/361 |
| 5,179,284 | 1/1993 | Kingsley et al. | 250/370.11 |
| 5,227,635 | 7/1993 | Iwanczyk | 250/370.12 |
| 5,276,329 | 1/1994 | Hughes | 250/370.11 |
| 5,401,668 | * 3/1995 | Kwasnick et al. | 250/370.11 |
| 5,463,224 | * 10/1995 | Burnstein et al. | 250/370.11 |
| 5,464,984 | * 11/1995 | Cox et al. | 250/370.11 |
| 5,641,984 | 6/1997 | Aftergut et al. | 257/433 |
| 5,707,880 | 1/1998 | Aftergut et al. | 437/3 |

FOREIGN PATENT DOCUMENTS

| | | |
|---|---|---|
| 0 528 676 | 8/1992 | (EP) . |
| 560871 | 3/1993 | (JP) . |
| 5-196742 | 8/1993 | (JP) . |
| 5-242841 | 9/1993 | (JP) . |
| 5-312961 | 11/1993 | (JP) . |
| 5-333353 | 12/1993 | (JP) . |

OTHER PUBLICATIONS

Journal of Polymer Science: part A–1, vol.4, 3027–3039 (1966) "A new general synthetic method for the preparation of linear poly–p–xylylenes", william F. gorham, pp. 3027–3039 (This document is based on the attached Japanese "Technical News" document.

\* cited by examiner

*Primary Examiner*—Constantine Hannaher
*Assistant Examiner*—Otilia Gabor
(74) *Attorney, Agent, or Firm*—Pillsbury Winthrop LLP

(57) ABSTRACT

Light-receiving devices are two-dimensionally arranged on a substrate, bonding pads electrically connected to the light-receiving devices in the respective rows or columns via signal lines are arranged on the outer periphery of the substrate, and a protective passivation film is disposed on the light-receiving devices and signal lines, thereby forming a light-receiving device array. A scintillator made of columnar crystals of CsI is deposited on the light-receiving surface of the light-receiving device array, whereas a protective film in which an Al inorganic film is held between organic films, made of Parylene is laminated thereon. The outer periphery of the protective film is cut at a position where the bonding pads are exposed, and is brought into close contact with the passivation film with the aid of the coating resin.

11 Claims, 4 Drawing Sheets

RADIATION DETECTION DEVICE AND METHOD OF MAKING THE SAME

RELATED APPLICATION

This is a continuation-in part application of application Ser. No. PCT/JP98/00550 filed on Feb. 12, 1998, now pending.

BACKGROUND OF THE INVENTION

1. Field of the Invention

The present invention relates to a radiation detection device; and, in particular, to a radiation detection device having a light-receiving portion with a large area, which is used for medical x-raying and the like.

2. Related Background Art

While X-ray sensitive films have conventionally been used for medical and industrial X-raying, radiation imaging systems using a radiation detection device are becoming pervasive due to their convenience and the storability of their photographed results. Such a radiation imaging system uses a radiation detection device having a plurality of pixels so as to acquire, as an electric signal, two-dimensional image data formed by a radiation, and processes thus obtained with a signal processing unit, so as to display it on a monitor. A typical radiation detection device is configured such that a scintillator is disposed on one- or two-dimensionally arranged photodetectors so as to convert the incident radiation into light, which is then detected.

Cesium Iodide (CSI), a typical scintillator material, is a hygroscopic material which dissolves by absorbing vapor (moisture) in the air. As a result, characteristics of the scintillator, such as resolution in particular, have disadvantageously deteriorated.

One radiation detection device having a structure for protecting the scintillator against moisture is the technique disclosed in Japanese Patent Application Laid-Open No. 5-196742. In this technique, a water-impermeable moisture-proof barrier is formed on the upper side of the scintillator layer, thereby protecting the scintillator against moisture.

SUMMARY OF THE INVENTION

In the above-mentioned technique, however, it is hard for the moisture-proof barrier in the outer peripheral portion of the scintillator layer to come into close contact with the substrate of the radiation detection device. For example, in a radiation detection device having a large area used for chest X-raying or the like, due to its long outer peripheral portion, there is a fear of peeling off the moisture-proof barrier. Hence, the hermetic sealing of the scintillator layer might become incomplete, moisture penetrates into the scintillator layer, it might cause a problem that deteriorates characteristics of the scintillator layer.

Also, the above-mentioned technique discloses a method of making a moisture seal layer for the moisture-proof barrier in which a silicone potting material or the like is coated on the scintillator layer in a liquid state or coated inside a window member disposed on the light-receiving surface side of the radiation detection device and then the window member is disposed on the scintillator layer before the moisture seal layer is dried, thereby fixing the moisture seal layer. In this method, it is hard to uniformly form the moisture seal layer on a scintillator layer having an irregular surface form, whereby adhesion may deteriorate. This phenomenon tends to occur in radiation detection devices having a large area, in particular.

In view of the foregoing problems, it is an object of the present invention to provide a radiation detection device having a uniform protective film, which is easy to make, for protecting the scintillator against moisture; and a method of making the same.

In order to achieve this object, the radiation detection device of the present invention comprises: (1) a light-receiving device array in which a plurality of light-receiving devices are one- or two-dimensionally arranged on a substrate to form a light-receiving portion, and a plurality of bonding pads electrically connected to the light-receiving devices in respective rows or columns of the light-receiving portion are disposed outside the light-receiving portion; (2) a scintillator layer, deposited on the light-receiving devices, for converting a radiation into detectable light with the light-receiving device; (3) a radiation-transmittable, moisture-resistant protective film covering at least the scintillator layer and exposing at least the bonding pad portion of the light-receiving device array; and (4) a coating resin coated on the moisture-resistant protective film along an edge acting as a boundary portion with respect to an exposed portion of the light-receiving device array so as to bring the edge of the moisture-resistant protective film into close contact with the light-receiving device array.

As a consequence, the incident radiation is converted into detectable light with the light-receiving device by the scintillator layer. As the resulting light image is detected by the one- or two-dimensionally arranged light-receiving devices, an electric signal corresponding to the incident radiation image is obtained. The scintillator layer has a characteristic of deteriorating by absorbing moisture. In the present invention, however, since the scintillator layer is covered with the moisture-resistant protective film, and an edge of the moisture-resistant protective film is coated with the coating resin, the scintillator layer is completely hermetically sealed so as to be isolated from the external atmosphere, thus being protected against vapor in the air. Further, the bonding pad portion for connection with an external circuit is exposed.

On the other hand, the method of making a radiation detection device in accordance with the present invention comprises: (1) forming a light-receiving portion by one- or two-dimensionally arranging a plurality of light-receiving devices and a plurality of bonding pads electrically connected to the light-receiving devices in respective rows or columns of the light-receiving portion are disposed outside the light-receiving portion on a substrate, and depositing a scintillator layer for converting a radiation into detectable light with the light-receiving devices thereon; (2) forming a radiation-transmittable, moisture-resistant protective film such as to envelope the light-receiving device array as a whole; (3) cutting and removing at least the part of the moisture-resistant protective film, outside the scintillator layer, covering the bonding pads so as to expose at least the part of the light-receiving device array in an area including the bonding pads; and (4) coating the moisture-resistant protective film with a resin along an edge portion acting as a boundary with respect to an exposed portion of the light-receiving device array so as to bring the edge of the moisture-resistant protective film into close contact with the light-receiving device array.

As the moisture-resistant protective film is formed such as to envelope the light-receiving device array as a whole, the adhesion between the scintillator layer and the moisture-resistant protective film improves, thereby forming a uniform film. As the uniform moisture-resistant protective film is removed from the bonding pad portion after being formed thereon, the bonding pad portion is securely exposed. Further, as the moisture-resistant protective film is coated with a resin along an edge portion acting as a boundary with respect to the exposed portion, the edge of the moisture-resistant protective film comes into close contact with the light-receiving device array surface thereunder, whereby the scintillator layer under the moisture-resistant protective film is sealed.

The moisture-resistant protective film may be a single layer organic film or a multilayer film made of at least two layers including an organic film laminated thereon.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a top plan view showing an embodiment of the present invention, whereas

FIG. 11 is a top plan view showing another embodiment of the present invention, whereas

DESCRIPTION OF THE PREFERRED EMBODIMENTS

Figure 1:
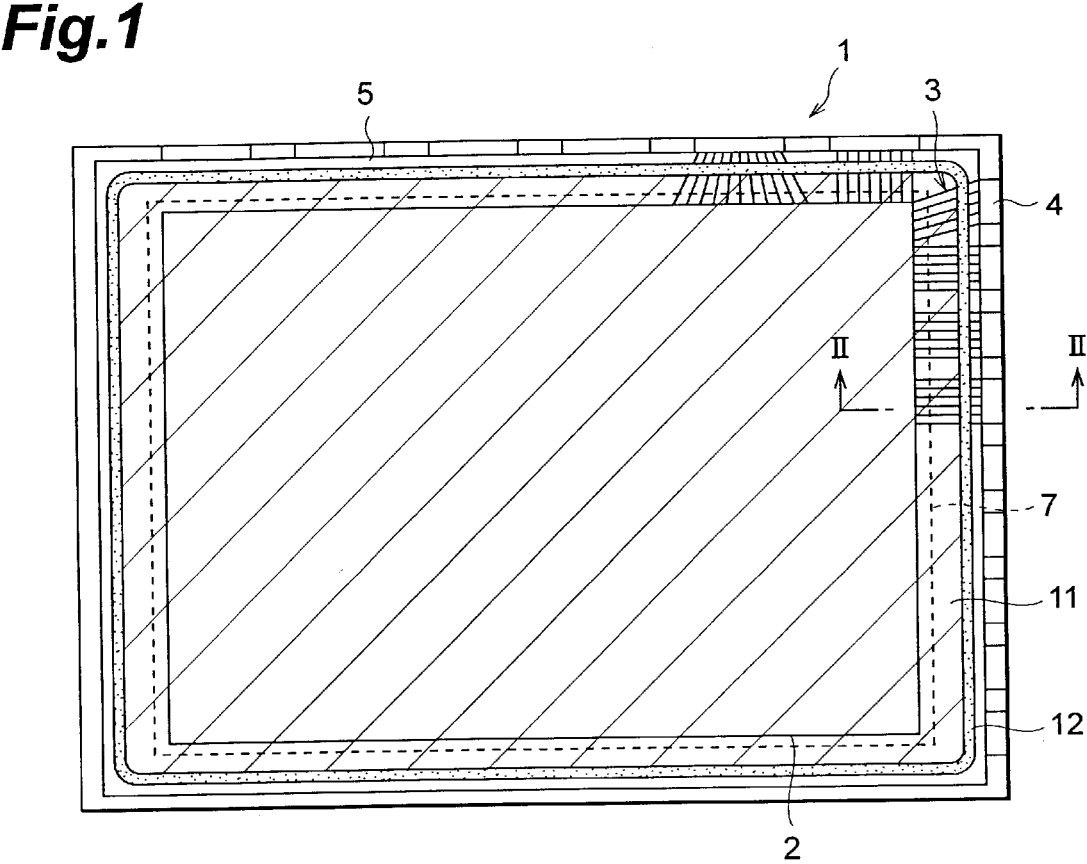

In the following, preferred embodiments of the present invention will be explained with reference to the drawings. To facilitate the comprehension of the explanation, the same reference numerals denote the same parts, where possible, throughout the drawings, and a repeated explanation will be omitted. Also, the dimensions and forms in each drawing are not always identical to those in practice but include parts exaggerated to facilitate understanding.

Figure 2:
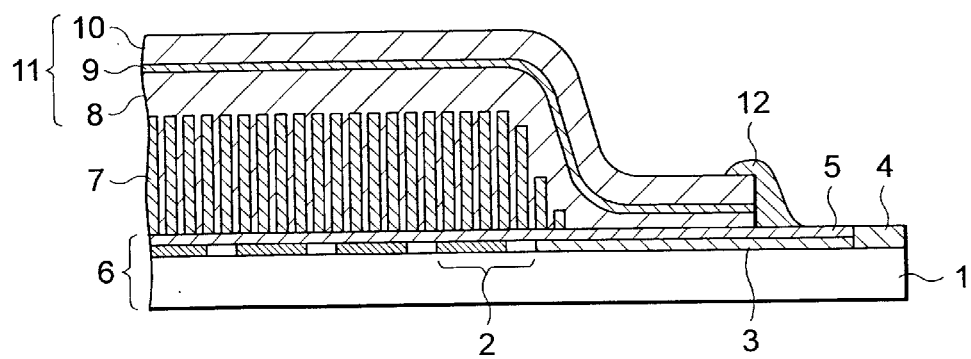
FIG. 2 is an enlarged sectional view of the taken along the line II—II.
Figure 3:
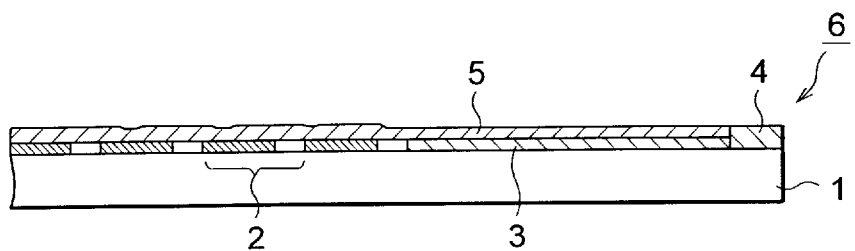
FIGS. 3 to 10 are views showing manufacturing procedures of the embodiment in accordance with FIGS. 1 and 2.

FIG. 1 is a top plan view showing an embodiment of the present invention, whereas FIG. 2 is an enlarged sectional view of its outer peripheral portion taken along the line II—II.

First, the configuration of this embodiment will be explained with reference to FIGS. 1 and 2. On an insulating substrate 1, such as that made of glass, for example, light-receiving devices 2 for effecting photoelectric conversion are arranged two-dimensionally, so as to form a light-receiving portion. Each light-receiving device 2 is constituted by a photodiode (PD) made of amorphous silicon or a thin-film transistor (TFT). The light-receiving devices 2 in the respective rows or columns are electrically connected to each other via signal lines 3 for reading out signals. A plurality of bonding pads 4 for taking out signals to an external circuit (not shown) are disposed along outer peripheral sides, e.g., two adjacent sides, of the substrate 1 and are electrically connected to their corresponding plurality of light-receiving devices 2 via the signal lines 3. An insulating passivation film 5 is formed on the light-receiving devices 2 and signal lines 3. For the passivation film 5, silicon nitride or silicon oxide is preferably used. On the other hand, the bonding pads 4 are exposed for connection with the external circuit. In the following, this substrate and the circuit portion on the substrate are referred to as a light-receiving device array 6.

Formed on the light-receiving portion of the light-receiving device array 6 is a scintillator 7, having a columnar structure, for converting an incident radiation into visible light. Though various materials can be used for the scintillator 7, Tl-doped CsI or the like, which has a favorable emission efficiency, is preferable. Laminated on the scintillator 7 are a first organic film 8, an inorganic film 9, and a second organic film 10, each transmitting X-rays therethrough but blocking vapor, thereby forming a protective film 11.

As the first organic film 8 and the second organic film 10, a poly-para-xylylene resin (manufactured by Three Bond Co., Ltd.; trade name: Parylene), such as poly-para-chloroxylylene (manufactured by the same company; trade name: Parylene C) in particular, is preferably used. The coating film made of Parylene has excellent characteristics suitable for the organic films 8, 10 in that, for example, it transmits therethrough only a very small amount of vapor and gasses, has high water repellency and chemical resistance, exhibits excellent electrical insulation even in a thin film, and is transparent to radiation and visible light. The details of the coating with Parylene are described in Three Bond Technical News (issued Sep. 23, 1992), and their characteristics will be noted here.

Parylene can be coated by chemical vapor deposition (CVD) method in which it is vapor-deposited on a support in vacuum as with the vacuum vapor deposition of metals. This method comprises a step of thermally decomposing p-xylene, which is a raw material, and rapidly cooling the resulting product in an organic solvent such as toluene or benzene, so as to yield di-para-xylylene which is known as dimer; a step of thermally decomposing this dimer so as to generate a stable radical para-xylylene gas; and a step of causing thus generated gas to be absorbed and polymerized on a material so as to form a poly-para-xylylene film having a molecular weight of about 500,000 by polymerization.

The pressure at the time of Parylene vapor deposition is 0.1 to 0.2 torr, which is higher than the pressure in the case of metal vacuum vapor deposition, 0.001 torr. Upon vapor deposition, a monomolecular film covers the whole material to be coated, and then Parylene is further vapor-deposited thereon. Consequently, a thin film having a thickness as small as 0.2 $\mu$m can be formed with a uniform thickness in the state free of pinholes. Therefore, the coating on acute angle portions, edge portions, and narrow gaps of the order of microns, which has been impossible with liquid materials, can be effected. Also, the coating can be effected at a temperature close to room temperature, without needing heat treatment and the like at the time of coating. As a consequence, mechanical stress or thermal distortion accompanying hardening would not occur, and the coating is excellent in stability as well. Further, coating is possible with respect to almost any solid material.

For the inorganic film 9, various materials such as those transparent, opaque, or reflective to visible light can be used as long as they can transmit X-rays therethrough. Oxidized films of Si, Ti, and Cr, and metal thin films of gold, silver, aluminum, and the like can be used. In particular, a film reflective to visible light is preferably used, since it is effective in preventing fluorescence generated in the scintillator 7 from leaking out, thereby enhancing sensitivity. Here, an example using Al which is easy to shape will be explained. Though Al itself is likely to corrode in the air, the inorganic film 9 is protected against corrosion since it is held between the first organic film 8 and the second organic film 10.

The outer periphery of the protective film 11 extends to the inside of the bonding pads 4 between the respective outer peripheries of the light receiving portion and the light-receiving device array 6, whereby the bonding pads 4 are exposed for connection with the external circuit. While this protective film 11 is formed by the above-mentioned Parylene coating, since it is formed by CVD method, it is formed such as to cover the whole surface of the light-receiving device array 6. Therefore, in order to expose the bonding pads 4, it is necessary that the protective film 11 formed by the Parylene coating be cut inside the bonding pads 4, and the outer part of the protective film 11 be removed. In this case, the protective film 11 would be likely to peel off from the outer peripheral portion acting as the cutting portion. Therefore, the outer peripheral portion of the protective film 11 and the passivation film 5 portion of the light-receiving device array 6 at the outer periphery thereof are coated and covered with a coating resin 12.

For the coating resin 12, a resin which favorably adheres to the protective film 11 and passivation film 5, such as WORLD ROCK No. 801-SET2 (70,000 cP type) manufactured by Kyoritsu Chemical Industries Co., Ltd., which is an acrylic adhesive, for example, is preferably used. This resin adhesive is hardened in about 20 seconds upon UV irradiation at 100 mW/cm$^2$. Thus hardened coating film is soft but has a sufficient strength, is excellent in resistances to moisture, water, galvanic corrosion, and migration, favorably adheres to various materials such as glass, plastics, and the like in particular, and thus has favorable characteristics as the coating resin 12.

Figure 4:
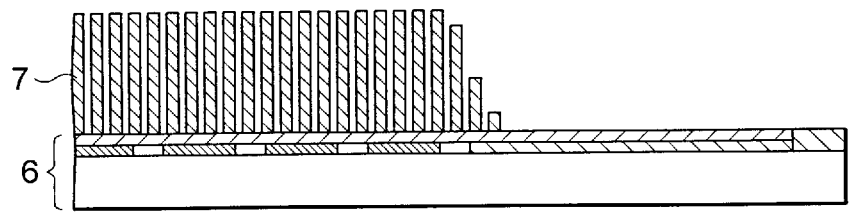

The manufacturing process of this embodiment will now be explained with reference to FIGS. 3 to 10. As shown in FIG. 4, columnar crystals of Tl-doped CsI are grown according to vapor deposition method by a thickness of 600 μm on the light-receiving surface of the light-receiving device array 6 shown in FIG. 3, so as to form a layer of the scintillator 7.

Figure 5:
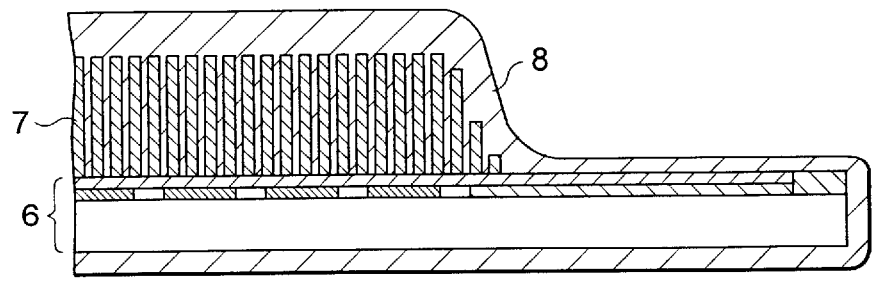

CsI, which forms the layer of scintillator 7 is highly hygroscopic, so that it dissolves by absorbing vapor in the air when left exposed. In order to prevent this phenomenon from occurring, as shown in FIG. 5, CVD method is used for enveloping the surfaces of the whole substrate with Parylene at a thickness of 10 μm, thereby forming the first organic film 8. Though there are gaps among the columnar crystals of CsI, Parylene intrudes into these narrow gaps, whereby the first organic film 8 comes into close contact with the scintillator layer 7. Further, the Parylene coating yields a precision thin film coating with a uniform thickness on the layer of scintillator 7 having irregularities. Since Parylene can be formed by CVD at a lower vacuum than in the case with the metal vapor deposition and at normal temperature as mentioned above, it can be processed easily.

Figure 6:
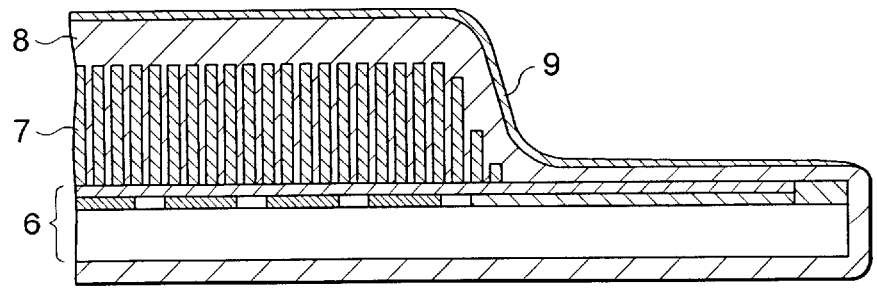
Figure 7:
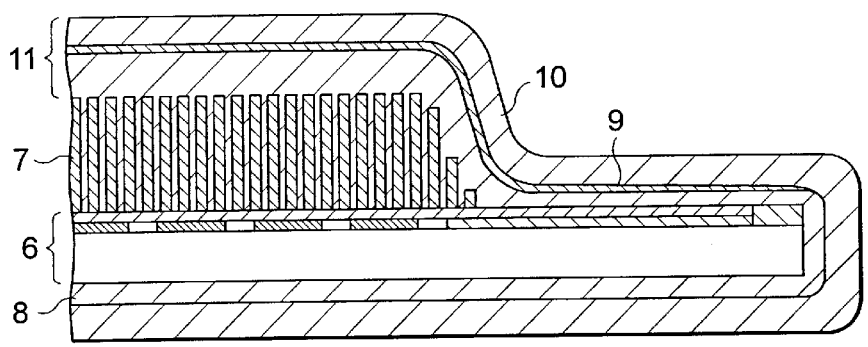

Further, as shown in FIG. 6, an Al film having a thickness of 0.15 μm is laminated on the surface of the first organic film 8 on the entrance side by vapor deposition method, thus forming the inorganic film 9. Then, by using CVD method again, the surface of the whole substrate is coated with Parylene at a thickness of 10 μm as shown in FIG. 7, thereby forming the second organic film 10. This second organic film 10 prevents the inorganic film 9 from deteriorating due to corrosion.

Figure 8:
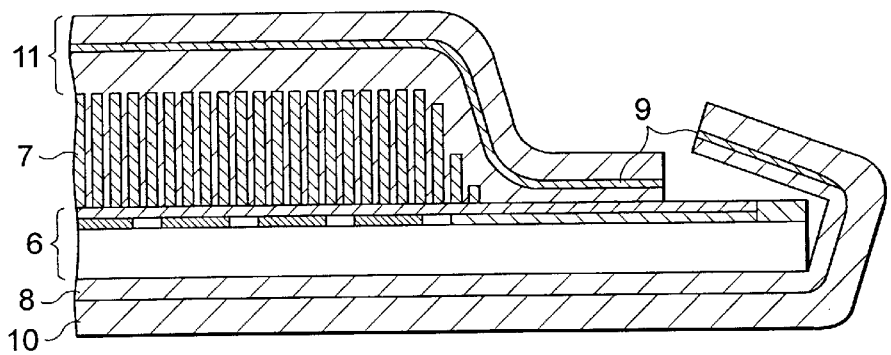
Figure 9:
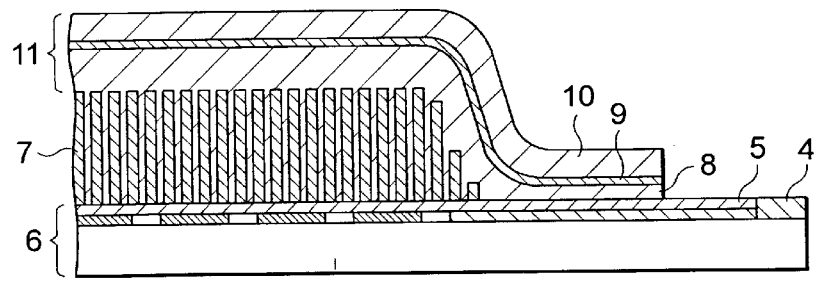
Figure 10:
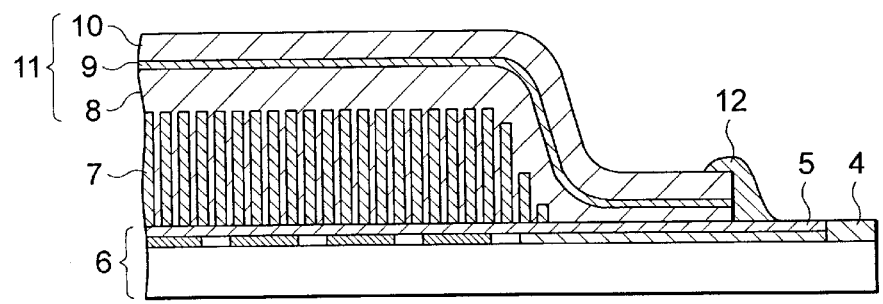

Thus formed protective film 11 is cut with an excimer laser or the like along the outer periphery of the light-receiving portion at the part inside the bonding pads 4 between the light-receiving portion and the outer peripheral portion of the light-receiving device array 6 as shown in FIG. 8, and then, from thus cut portion, the unnecessary parts of the protective film 11 on the outer side thereof and the rear side of the entrance surface are removed as shown in FIG. 9, so as to expose the bonding pads 4 for connection with the external circuit. Since the passivation film 5 and the first organic film 7 disposed as the lowermost layer of the protective film 11 do not adhere well to each other, the protective film 11 will be likely to peel off if the cut outer peripheral portion is left as it is. Therefore, as shown in FIG. 10, the outer peripheral portion of the protective film 11 and the part of the passivation film 5 therearound are coated and covered with the coating resin 12, which is then hardened upon UV irradiation, whereby the protective film 11 closely adheres onto the light-receiving device array 6. As a consequence, the scintillator 7 is hermetically sealed, whereby resolution can be prevented from deteriorating due to moisture absorption.

The operation of this embodiment will now be explained with reference to FIGS. 1 and 2. An incident X-ray (radiation) from the entrance surface side is transmitted through the protective film 11 made of the first organic film 8, inorganic film 9, and second organic film 10, so as to reach the scintillator 7. This X-ray is absorbed by the scintillator 7, which emits visible light in proportion to the dose of the X-ray. Of thus emitted visible light, the part directed opposite to the incident direction of the X-ray is reflected by the inorganic film 9. As a consequence, substantially all the visible light generated by the scintillator 7 is made incident on the light-receiving device 2 located downstream the scintillator 7. Hence, efficient detection can be effected.

In each light-receiving device 2, an electric signal corresponding to the light quantity of the visible light is generated by photoelectric conversion and is stored for a predetermined period of time. Since the light quantity of the visible light reaching the light-receiving device 2 corresponds to the dose of the incident X-ray, the electric signal stored in each light-receiving device 2 corresponds to the dose of the incident X-ray, whereby an image signal corresponding to an X-ray image is obtained. The image signals stored in the light-receiving devices 2 are sequentially read out from the bonding pads 4 via the signal lines 3, transferred to the outside, and processed in a predetermined processing circuit, whereby the X-ray image can be displayed.

Though the foregoing explanation relates to the protective film 11 having a configuration in which the inorganic film 9 is held between the first and second organic films 8, 10 made of Parylene, the first organic film 8 and the second organic film 10 may be made of materials different from each other. Also, when a material highly resistant to corrosion is used for the inorganic film 9, the second organic film 10 per se may be omitted.

Though an example in which the coating resin 12 is formed on the passivation film 5 outside the part of the light-receiving device array 6 formed with the light-receiving devices 2 is explained here, it will be difficult to form the resin coating 12 at a boundary portion between the light-receiving device 2 and the bonding pad 4 if they are located close to each other. For securely exposing the bonding pad 4 and securely coating the periphery of the protective film 12 with the coating resin 12, it is preferred that the position of the coating resin 12 be shifted toward the light-receiving device 2. To this end, the scintillator 7 is not formed on the whole surface on the light-receiving devices 2 but on the light-receiving devices 2 in the effective screen area excluding the pixels near the bonding pads 4. Then, after the protective film 11 is formed all over the formed layer of scintillator 7, the protective film 11 is coated with the coating resin 12 on the pixels of the light-receiving devices 2 whose upper face is not formed with the scintillator 7. In this case, since the pixels near the bonding pads 4 are covered with the coating resin 12 or are free of the scintillator 7 on the front side, their sensitivity to the radiation decreases. As a result, these pixels are unusable, thus reducing the number of effective pixels and effective screen area in the light-receiving devices 2. When the light-receiving devices 2 constitute a large screen and have a large number of pixels in total, however, the ratio of the ineffective pixels is small and, depending on the configuration of devices, they may yield a merit that manufacturing becomes easier.

Figure 11:
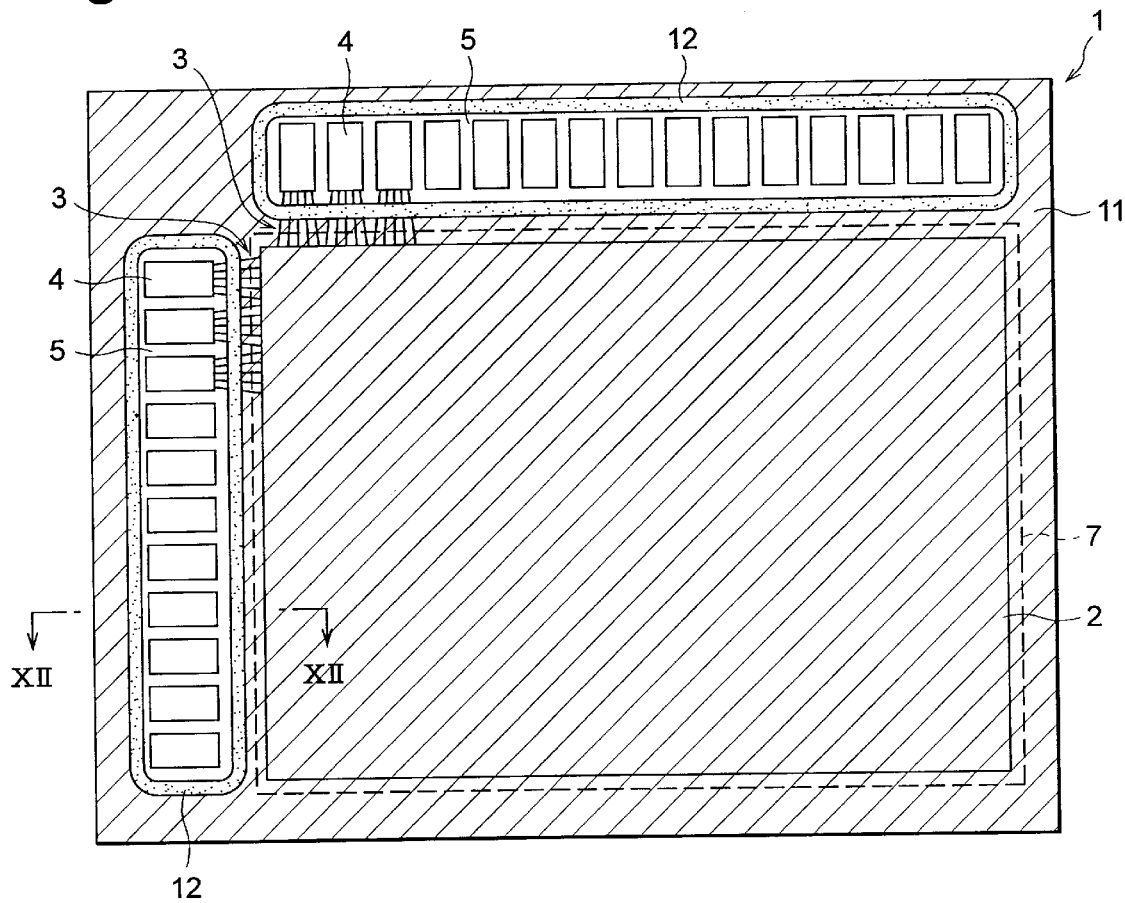
Figure 12:
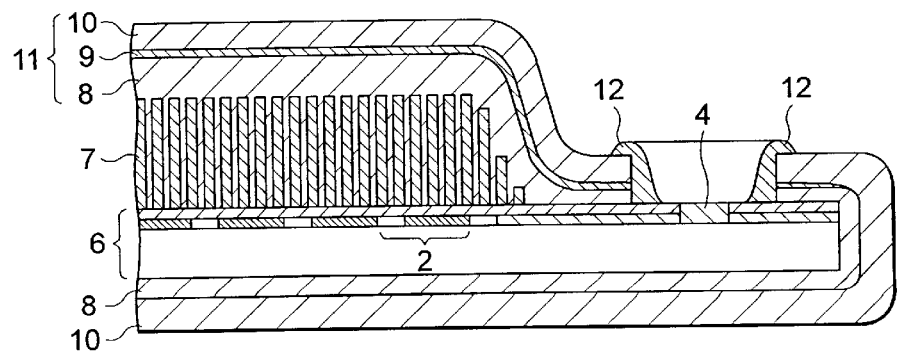
FIG. 12 is an enlarged sectional view thereof taken along the line XII—XII.

With reference to FIGS. 11 and 12, another embodiment of the present invention will now be explained. FIG. 11 is a top plan view of the radiation detection device in accordance with this embodiment, whereas FIG. 12 is an enlarged sectional view thereof taken along the line XII—XII. Since the basic configuration of this device is basically the same as that of the embodiment shown in FIGS. 1 and 2, only their differences will be explained in the following.

In the embodiment shown in FIGS. 11 and 12, the protective film 11 is formed on the whole surface of the light-receiving device array 6 on the light-receiving surface side and the rear side, exposing only the bonding pad array 4 portion. The coating resin 12 is coated along the boundaries (edges) of the protective film 11 such as to surround the exposed bonding pad array 4 portion. Since the bonding pad 4 portion is securely exposed, and the protective film 11 securely adheres to the light-receiving device array 6 with the aid of the coating resin 12, the layer of scintillator 7 is hermetically sealed, whereby it can be prevented from deteriorating due to moisture absorption in this embodiment as well.

This embodiment is effective in that it can reduce the length of the edge portion acting as a boundary portion which may cause the protective film to peel off, in particular, in the case of CCD or MOS type imaging devices in which the bonding pad 4 portion is small.

Further, though the foregoing explanation relates to so-called surface entrance type radiation detection devices in which radiation is incident thereon from the scintillator side on light-receiving devices, the present invention is also applicable to so-called rear face entrance type radiation detection devices. Such a rear face entrance type radiation detection device can be used as a high-energy radiation detection device.

The moisture-resistant protecting film is not limited to above-mentioned multilayer film, the single layer organic filmmade of Parylene or the like can be also applied.

As explained in the foregoing, for protecting a highly hygroscopic scintillator, a protective film made of Parylene or the like is formed on the scintillator, and edges of the protective film are bonded to the light-receiving device array with a resin coating of acrylic or the like, whereby the scintillator layer is hermetically sealed in accordance with the present invention. In particular, since the peeling from the edges of the protective film is prevented from occurring, resistance to moisture would be improved.

In the manufacturing method of the present invention, the protective film is formed and then unnecessary parts thereof are removed, whereby the protective film in a uniform state is formed more easily as compared with the case where the protective film is formed on only necessary parts, while securely exposing the bonding pads. Also, since the protective film penetrates through the gaps among the deposited columnar crystals in the scintillator layer as well, the adhesion between the protective film and scintillator layer increases.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radiation detection device comprising:
   a light-receiving device array in which a plurality of light-receiving devices are one- or two-dimensionally arranged on a substrate to form a light-receiving portion, and a plurality of bonding pads electrically connected to said light-receiving devices in respective rows or columns of said light-receiving portion and disposed outside said light-receiving portion;
   a scintillator layer, deposited on said light-receiving devices, for converting a radiation into detectable light with said light-receiving device;
   a radiation-transmittable, moisture-resistant protective film covering at least said scintillator layer and exposing at least said bonding pad portion of said light-receiving device array; and
   a coating resin coated on a peripheral portion of said moisture-resistant protective film so as to bond an edge of said moisture-resistant protective film to said light-receiving device array.

2. A radiation detection device according to claim 1, wherein said bonding pads are positioned at an outer peripheral portion of said substrate, said moisture-resistant protective film extending to an area between an outer perimeter of said light-receiving portion and an outer perimeter of said light-receiving device array, an outer peripheral portion of said moisture-resistant protective film being coated with said coating resin.

3. A radiation detection device according to claim 1, wherein said moisture-resitant protective film is a single layer organic film.

4. A radiation detection device according to claim 1, wherein said moisture-resistant protective film constituted by a multilayer film made of at least two layers including an organic film laminated thereon.

5. A radiation detection device according to claim 4, wherein said multilayer film including an inorganic layer.

6. A method of making a radiation detection device comprising:
   forming a light-receiving portion, said forming a light-receiving portion including
   one- or two-dimensionally arranging a plurality of light-receiving devices and a plurality of bonding pads electrically connected to said light-receiving devices in respective rows or columns of said light-receiving portion and disposed outside said light-receiving portion on a substrate, and
   depositing a scintillator layer for converting a radiation into detectable light with said light receiving devices thereon;
   forming a radiation-transmittable, moisture-resistant protective film so as to envelope said light-receiving device array as a whole;

cutting and removing at least part of said moisture-resistant protective film, outside said scintillator layer, covering said bonding pads so as to expose at least the part of said light-receiving device array in an area including said bonding pads; and coating a peripheral portion of said moisture-resistant protective film with a resin so as to bond the edge of said moisture-resistant protective film to said light-receiving device array.

7. A method of making a radiation detection device according to claim 6, wherein said forming a moisture-resistant protective film comprises:

forming a radiation-transmittable first organic film configured to envelope said light-receiving device array as a whole; and laminating at least one layer of film on said first organic film so as to form a radiation-transmittable, moisture-resistant protective film constituted by a multilayer film made of at least two layers.

8. A method of making a radiation detection device according to claim 7, wherein said multilayer film includes an inorganic film.

9. A method of mailing a radiation detection device comprising:

forming a light-receiving portion by one- or two-dimensionally arranging a plurality of light-receiving devices and a plurality of bonding pads electrically connected to said light-receiving devices in respective rows or columns of said light-receiving portion are disposed outside said light-receiving portion on a substrate, and depositing a scintillator layer for converting a radiation into detectable light with said light-receiving devices thereon;

forming a radiation-transmittable, moisture-resistant protective film configured to envelope said light-receiving device array as a whole;

cutting said moisture-resistant protective film along an outer periphery of said scintillator layer at a position between the outer periphery of said scintillator layer and said bonding pad portion, and removing the part of said moisture-resistant protective film formed outside thus cut surface and on the side opposite to an entrance surface so as to expose said bonding pads; and coating an outer peripheral portion of said moisture-resistant protective film with a resin so as to bond the outer peripheral portion of said moisture-resistant protective film to said light-receiving device array.

10. A method of making a radiation detection device according to claim 9, wherein said forming a moisture-resistant protective film comprises:

forming a radiation-transmittable first organic film configured to envelope said light-receiving device array as a whole; and laminating at least one layer of film on said first organic film so as to form a radiation-transmittable, moisture-resistant protective film constituted by a multilayer film made of at least two layers.

11. A method of making a radiation detection device according to claim 10, wherein said multilayer film includes an inorganic film.

* * * * *